United States Patent [19]

Ellis et al.

[11] 4,394,179

[45] Jul. 19, 1983

[54] ABRASIVE-CONTAINING CONTACT LENS CLEANING MATERIALS

[75] Inventors: Edward J. Ellis, Georgetown; Joseph C. Salamone, Marblehead, both of Mass.

[73] Assignee: Polymer Technology Corporation, Wilmington, Mass.

[21] Appl. No.: 197,223

[22] Filed: Oct. 15, 1980

Related U.S. Application Data

[63] Continuation-in-part of Ser. No. 51,960, Jun. 25, 1979, abandoned.

[51] Int. Cl.³ .................... B08B 11/00; B08B 7/00; C11D 3/14; C11D 17/08
[52] U.S. Cl. .......................................... 134/7; 134/42; 252/89.1; 252/106; 252/155; 252/173; 252/174.17; 252/174.18; 252/174.23; 252/174.24; 252/174.25; 252/550; 252/551; 252/DIG. 2; 252/DIG. 14
[58] Field of Search ............... 134/40, 42, 7; 252/106, 252/140, 155, 173, 174.25, 131, 550, 551

[56] References Cited

U.S. PATENT DOCUMENTS

| | | | |
|---|---|---|---|
| 3,576,750 | 4/1971 | Muhler | 252/140 |
| 3,736,259 | 5/1973 | Buck | 252/174.25 |
| 3,884,826 | 5/1975 | Phares | 252/106 |
| 4,072,622 | 2/1978 | Kuhling | 252/179 |
| 4,096,870 | 6/1978 | Manfuso | 134/28 |
| 4,126,587 | 11/1978 | Sibley | 252/541 |
| 4,181,633 | 1/1980 | Colodney | 252/525 |
| 4,215,004 | 7/1980 | Borgerding | 252/156 |
| 4,222,747 | 9/1980 | Dauguet | 51/301 |
| 4,240,919 | 12/1980 | Chapman | 252/95 |

OTHER PUBLICATIONS

Schuman, L. J., et al., "Aerosol Rug Shampoo Soil Retardant", *Soap & Chemical Specialties,* Mar. 1970, pp. 43, 44, 46, 50, 70 & 71.

*Primary Examiner*—Dennis L. Albrecht
*Attorney, Agent, or Firm*—Wolf, Greenfield & Sacks

[57] ABSTRACT

New cleaning solutions for contact lens have a surface active agent, an inorganic abrasive, and a suspending agent to provide a suspension in an aqueous solution or organic liquid.

3 Claims, No Drawings

ABRASIVE-CONTAINING CONTACT LENS CLEANING MATERIALS

RELATED APPLICATION

This application is a continuation-in-part of U.S. application Ser. No. 51,960, filed June 25, 1979 (now abandoned).

BACKGROUND OF THE INVENTION

It has long been recognized in the art that contact lenses must remain free of surface deposits in order to maintain their wearing comfort and optimum vision and reduce the potential for ocular change. Unfortunately, contact lenses are susceptible to acquiring surface deposits from exogenous sources (mascara, hair spray, etc.) and endogenous sources (mucous, oily meibomian secretions, etc.). Silicone containing contact lenses are the most vulnerable of all contact lenses to the acquisition of tenacious, waxy surface deposits that are difficult, if not impossible, to totally remove without damaging the lens.

Previous hard and soft contact lens cleaning solutions have used a variety of water soluble cleansing agents, in addition to water soluble hydrating polymers in sterile homogeneous aqueous solution. Other cleaning agents have employed thixotropic synthetic water soluble polymers and thixotropic synthetic clays with detergents to give stiff gels for the cleaning of hard contact lenses. The cleaning process involves removal of contaminants from the surfaces of the contact lens without scratching or otherwise affecting the lens material.

Abrasives are employed in the manufacturing of contact lenses in a polishing process which provides the contact lens with optical quality surfaces. Polishes are also employed to blend the edge of the lens and to make minor alterations in the power of the lens. Abrasive materials have not been used in contact lens cleaning solutions heretofore, perhaps because such abrasives would have the propensity to scratch or otherwise alter the surface of the plastic contact lens, thus leading to a reduction in optical clarity as well as enhanced eye irritation.

SUMMARY OF THE INVENTION

It is an object of this invention to provide a contact lens cleaning material which consists essentially of a surface active agent, an inorganic abrasive and a suspending vehicle which material is highly useful as a cleaner enabling superior cleaning of silicone-containing plastic contact lenses while also useful as a cleaner and/or cleaner/polisher for other contact lens materials.

It is still another object of this invention to provide a method of cleaning of ophthalmic contact lens which method comprises applying a cleaning solution containing an abrasive to a surface of the lens and mildly abrading said surface to remove unwanted surface deposits if present without changing the power of the contact lens.

According to the invention, a contact lens cleaning material consists essentially of a surface active agent, an inorganic abrasive and a suspending vehicle such as water or an organic liquid. Means are provided to maintain the surface active agent and abrasive in substantially uniform suspension so that the solution is capable of cleaning a contact lens without adversely affecting the lens. The material is preferably a liquid solution but can be in a paste or gel form. The cleaner can have a polishing action as where the proper abrasive material is chosen and its concentration increased. Preferably the abrasive is of a proper particle size distribution so as not to scratch the lens when used.

According to the method of this invention, an opthalmic contact lens is cleaned by mildly abrading the surface of the lens in the presence of a cleaning solution containing an abrasive, a surface active agent, a liquid vehicle and a suspending agent. The cleaning solution is applied and the surface of the lens mildly abraded to remove unwanted surface deposits, if present, without imparting scratches in the lens surfaces and without changing the curvature or power of the lens surfaces. By increasing the abrasive content in the formulation a cleaner/polish can result. When used properly, the cleaner/polish will not only clean the surface of the lens but also provide a polishing action which removes any scratches present, thus restoring the optical integrity of the lens surface. Additionally, the cleaner/polish can be used to make minor adjustments in the power of a contact lens.

It is a feature of this invention that there is multifold enhancement of the cleaning effectiveness of certain surface active agents by increasing the friction produced as the surface active agent is rubbed over the plastic surfaces. This is accomplished by the introduction into the surface active agent solution of solid abrasive particles the size and concentration of which can be varied according to the function desired for the formulation. The particle size normally utilized is comparable to, or smaller than, the abrasive used to polish lens surfaces during manufacture as is conventionally known. The particles remain uniformly suspended in the surface active agent solution without settling since settling could vary the effectiveness of the cleaner and without aggregating which could cause scratches on the lens surface.

It is another feature of this invention that the suspending agent for the abrasive particles is such that the overall suspension is stable substantially indefinitely. The cleaning solution may contain sterilizing and buffering agents as well as a fragrance. In certain cases it may be possible to utilize a surfactant for both suspending the abrasive particles and providing cleaning action. However, it is more common to use a high concentration of a water soluble salt or an organic polymer to act as a suspending agent.

Although the cleaning solutions described in this application are especially useful for cleaning and/or cleaning and polishing hard, gas permeable contact lenses containing siloxane, they are also useful for hard contact lenses fabricated from polymethyl methacrylate, silicones and cellulose acetate butyrate as well as other plastics and other materials used for ophthalmic contact lenses.

DESCRIPTION OF PREFERRED EMBODIMENTS

The preferred formulation of the novel contact lens cleaning solution of this invention utilizes a surface active agent with an abrasive for combined chemical and mechanical cleaning action and a suspending agent for the abrasive such that a stable suspension is formed, in an aqueous solution.

The preferred surface active agents are detergents or surfactants such as anionic sulfates conforming to the following general structure:

$$C_nH_{n+1}O(CH_2CH_2O)_xSO_3^-R^+$$

where
- x varies from 0 to 10
- n varies from 8 to 20
- $R^+$ is $Na^+$, $K^+$, $NH_4^+$, $\frac{1}{2}Mg^{++}$, $HN^+(CH_2CH_2OH)_3$ Examples of such detergents include:
Sodium lauryl sulfate
sodium cetyl sulfate
sodium octyl sulfate
sodium tridecyl sulfate
sodium oleyl sulfate
sodium tridecyl ether sulfate
triethanolamine lauryl sulfate
ammonium lauryl ether sulfate
sodium lauryl ether sulfate
magnesium lauryl sulfate The abrasive compound or compounds are water insoluble inorganic compounds employed for their abrasive characteristics. The abrasive material is a relatively hard, tough substance composed of irregularly shaped particles and is ordinarily used for grinding, smoothing, and polishing. In general, the abrasive industry teaches that fine grinding abrasives have average particle sizes ranging between 10 and 100 microns while polishing abrasives have average particle sizes below 10 microns. Other parameters that determine the utility of effectiveness of an abrasive would include particle size distribution, particle shape, particle density, and particle hardness. While it is generally preferable to employ abrasives with an average particle size of 10 microns or less in this invention, it has been found that certain materials with an average particle size of up to 20 microns or less are suitable.

Such abrasives could be chosen from:
Aluminas—calcined, hydrated, tabular
Silicas—amorphous, crystalline or synthetic such as silica gels
Aluminum silicates (Kaolin)
Magnesium silicates (Talc)
Magnesium carbonate
Magnesium oxide
Calcium carbonate
Titanium dioxide
Zirconium oxide
Cerium oxide
Cesium oxide
Barium sulfate (Barytes)
Bentonite
Pumice The suspending agent or agents in this composition must provide a stable suspension of the abrasive in the cleaning solution. Such suspensions could be achieved by increasing the viscosity of the aqueous solution through the addition of soluble salts and/or hydrophilic polymers or by the addition of water soluble neutral or ionic polymers which can interact with the surface of one or more inorganic abrasive particles, thus preventing or hindering precipitation from occurring.

Such suspending agents can be one or more of the following:
alkali metal halides (high concentration
alkaline earth metal salts (moderate concentration)
polyvinyl alcohol
polyacrylamide
hydrolyzed polyacrylamide
polyacrylic acid
xanthan gum
hydroxyethyl cellulose
hydrolyzed polyacrylonitrile starch
carboxymethyl cellulose
cellulose sulfate
methyl cellulose
methyl hydroxyethyl cellulose
methyl hydroxypropyl cellulose
poly-N-vinylpyrrolidone
guar gum
carboxymethyl guar gum
hydroxyethyl guar gum, hydroxypropyl guar gum
hydrolyzed polyacrylonitrile 2-acrylamido-2-methyl-propane sulfonate starch
clays such as bentonite, montorillonite and hectorite
neutral, cationic and anionic detergents
partially acetylated cellulose
gelatin
polyethylene glycol and oxide, polyethylene oxide/-polypropylene oxide block copolymers
K-carageenan Buffering agents can be used and are preferably those commonly employed in the art within a pH range of 5 to 8, and usually between 7 and 8. Such buffers include boric acid, sodium borate, phosphoric acid, disodium phosphate and sodium bicarbonate.

The use of salts as suspending agents generally renders the cleaning solution sterile; however, in cases where sterility must be imparted, anti-microbial compounds can be used. Such compounds include chlorhexidine and its salts, benzalkonium chloride, phenyl mercuric acetate, phenethyl alcohol, methyl or propyl paraben, cetyl pyridinium chloride, thimersol and the like, in possible conjunction with EDTA.

Fragrances such as wintergreen or peppermint can be used if desired.

In the simplest fashion, the contact lens is cleaned by immersing the lens in the cleaning solution or spraying the lens and by providing agitation of the solution such as by rubbing, shaking, or wiping of the cleaning solution on the lens surface. The lens is then rinsed with water and inserted directly into the eye or it is placed in a soaking and/or wetting solution prior to insertion.

Specific examples of this invention are given below but are not meant in any way to limit this invention.

EXAMPLE I

| Formulation: | |
|---|---|
| Sodium tridecyl ether sulfate (30%) | 80 gms |
| distilled water | 160 gms |
| sodium chloride | 20 gms |
| silica (Syloid 63 - a trademarked product of W. R. Grace Co. of Baltimore, Maryland, containing silica gel of about 9 micron average particle size | 24 gms |

The sodium chloride was dissolved in the water followed by the addition of the silica powder. Once the silica had been dispersed thoroughly the surfactant was added and mixing continued until a smooth viscous suspension was achieved. No settling of the abrasive was noted after eight months of shelf storage.

EXAMPLE II

| Formulation: | |
|---|---|
| Sodium tridecyl ether sulfate (30%) | 133 gms |
| distilled water | 267 gms |
| sodium chloride | 30 gms |
| silica (Syloid 63) | 8 gms |

Preparation was identical to that described in Example I.

EXAMPLE III

| Formulation: | |
|---|---|
| Sodium tridecyl ether sulfate (30%) | 133 gms |
| distilled water | 267 gms |
| sodium chloride | 30 gm |
| silica (Syloid 63) | 1 gm |

Preparation was identical to that described in Example I.

EXAMPLE IV

| Formulation: | A | B | C |
|---|---|---|---|
| sodium tridecyl ether sulfate (30%) | 133 gms | 133 gms | 133 gms |
| distilled water | 267 | 267 | 267 |
| sodium chloride | 30 | 30 | — |
| silica (Syloid 63) | 12 | — | — |

Cleaning solutions were prepared in the same manner as that described in Example I.

Contact lenses having a high silicone content characteristically develop a tenacious waxy surface deposit that is difficult and often impossible to remove with solvents, surfactants or polishing without damaging the surfaces of the lenses. Such deposits are best visualized by studying a rinsed and dried lens against a black background (with a self-illuminating binocular microscope and can be quantitated by grading 1 to 4 according to surface area and thickness (opaqueness), a rating of 4 indicating a severe deposit. Sixty pairs of lenses having roughly symmetrical surface deposits of grade 2 or greater were subjected to the following procedure: one lens of each pair was cleaned manually using formulation "A". The companion lenses were broken up into three groups of twenty. One group was cleaned manually with formulation "B", the second group with formulation "C" and the final group with various commercial contact lens cleaners (solutions and gels). It was found that formulation "B" and "C" were equally effective but that formulation "A" was manifold more effective than formulation "B" or "C" in all cases. In fact, formulation "B" and "C" were relatively ineffective in removing grade 4 deposits whereas this invention (formulation "A") was very effective in all cases. Finally, none of the commercial contact lens cleaners were more effective than formulations "B" and "C" and many were less effective. This example points out the utility of a suspended abrasive in providing improved cleaning action over simple surfactant solutions.

EXAMPLE V

The cleaning solution described in Example III was provided to a number of patients at the commencement of their wearing newly fabricated hard contact lenses (containing silicone). They were instructed to clean their lenses nightly with this formulation. Their lenses were inspected after 6 months and compared with the lenses of a similar group of subjects who cleaned their lenses nightly with a variety of commercial contact lens cleaners. The lenses of patients using the cleaning solution of Example III were significantly freer of surface deposits and were, as a rule, more comfortable.

The cleaning solution described in Example III was also given to a small group of conventional polymethyl methacrylate contact lens wearers who complained of blurred vision as the result of the development of "dry" spots on the front surface of their lenses that recurred when cleaned nightly by a variety of commercial contact lens cleaners, solvents, or polishing. In all cases, the nightly use of this invention eliminated the hydrophobic or dry areas and the subjects' vision remained clear during their daily wearing schedule.

EXAMPLE VI

The surfaces of all hard contact lenses eventually become scratched. Conventional polishes remove shallow scratches and smooth the ridges adjacent to deeper scratches, thereby improving the comfort and optics of the lenses. However, many of these scratched contact lenses also have significant surface deposits which are not removed by polishing. In fact, polishing contact lens surfaces that have heavy deposits may simply spread and redistribute the deposits thereby reducing the surface wettability even further. The cleaning solution described in Example I combines the function of a cleaner (to remove surface film) and a polish (to remove surface scratches) and it it far more effective than using a cleaner and a polish in separate operations. A cleaner/polish such as described in Example I is then particularly useful to the practitioner for restoring the optics and wettability of hard contact lenses.

EXAMPLE VII

| Formulation: | |
|---|---|
| Sodium tridecyl ether sulfate (30%) | 100 gms |
| 4% HEC solution | 200 gms |
| aluminum oxide (0.06 micron) | 10 gms |

Dissolve 4% by weight hydroxyethyl cellulose (cellosize QP-40, a product of Union Carbide Corp. of New York, N.Y.) in distilled water. The surfactant is then added and the solution mixed well. The aluminum oxide is then blended thoroughly into this solution until a smooth viscous solution is achieved.

This Example demonstrates the use of a water soluble polymer to suspend the abrasive powder.

EXAMPLE VIII

| Formulation: | |
|---|---|
| sodium tridecyl ether sulfate (30%) | 100 gms |
| distilled water | 200 gms |
| Hydrite 10 (kaolin clay) | 30 gms |
| sodium chloride | 25 gms |

The preparation was identical to that described in Example I.

This Example demonstrates the use of kaolin, a material which imparts a "milder" abrasive action when compared to silica and alumina.

EXAMPLE IX

| Formulation: | |
|---|---|
| sodium tridecyl ether sulfate (30%) | 100 gms |
| glycerin | 200 gms |
| silica (Syloid 63) | 3 gms |

The surfactant was dissolved in glycerin then the silica was blended into this solution.

This Example demonstrates the use of an organic liquid in conjunction with the surfactant to achieve a transparent cleaning solution.

EXAMPLE X

The following cleaner composition was used as the base formulation for classifying various abrasives with respect to their tendency to scratch contact lenses and contact lens material.

| | |
|---|---|
| Sodium tridecyl ether sulfate (30%) | 100 gms. |
| distilled water | 80 gms. |
| sodium chloride | 15 gms. |
| abrasive | 30 gms. |

The sodium chloride was dissolved in the water followed by the addition of the abrasive powder. Once the powder had been dispersed thoroughly the surfactant was added and mixing continued until a smooth viscous suspension was achieved.

EXAMPLE XI

A "Manual Cleaner Analysis" was performed to estimate the potential of a cleaner formulation to scratch contact lenses under actual use conditions. The level of abrasive in the cleaner formulation was deliberately set at a high level in order to more easily differentiate between the various abrasives tested.

Samples for this analysis were "The Boston Lens" TM contact lenses. These are highly oxygen permeable, siloxane based hard contact lenses originating from Polymer Technology Corp. of Wilmington, Mass. The surfaces were highly polished and of excellent optical quality.

The tests were performed by placing a small amount, 5 drops, of the cleaner formulation into the palm of the hand. A test lens was placed on the print area of the index finger of the other hand. The convex surface of the lens was then pressed into the cleaner, against the palm, and moved in a circular motion making 50 circuits of the palm area. The lens was rinsed with water, dried, and inspected for scratches under magnification (20×).

EXAMPLE XII

A "Cleaning Action Simulation" test was devised to classify various abrasives, contained in a cleaner formulation, as to their propensity to scratch the surface of a lens material. The test was designed to accurately and reproducibly determine the effects of long term patient use of a cleaner compound, containing an abrasive material, on their contact lenses. The level of abrasive in the cleaner formulation was purposely set at a high level so that long term effects could be estimated in a relatively short testing period.

The lens material utilized throughout the testing program was "The Boston Lens" TM material, a siloxane based composition with a Rockwell Hardness of approximately 80 on the M scale. Samples were in the form of 3/16"×½" discs (buttons) with the testing surface polished to represent the high quality optical finish found on actual contact lenses.

A modified crockmeter was utilized as the testing apparatus with the arm exerting a total load of 150 gms on the sample button. After mounting a button, the arm was moved to its farthest left extension point and supported off the base. A piece of velveteen cloth was stretched across the base of the simulator and secured. The cleaning composition to be tested was applied to the cloth from an applicator bottle along the stroke path (approximately 1" wide×5" long) the lever arm was lowered onto the cloth and the simulator activated. The action of the simulator was such that the button was rubbed back and forth on the cleaner for a predetermined number of strokes (set on the counter) over a path totaling 4" in length. The sample button was removed, rinsed with water, dried, and inspected for scratches under magnification (20×).

The following scale was used to qualitatively rank abrasives according to their ability to scratch the surface of the sample.

0—no scratching
+—slight scratching
++—moderate scratching
+++—heavy scratching

The above ranking reflects scratch density.

EXAMPLE XIII

This Example illustrates the use of IMSIL Silicas (a synthetic silica sold by Illinois Minerals Co. of Illinois) as the abrasive component in a contact lens cleaning composition. The cleaner formulation is given in Example X and the testing protocol in Examples XI and XII.

The IMSIL grades of micronized silica, when evaluated by the Manual cleaning procedure, produced only slight scratching in the worst case (IMSIL A-25). When evaluated in the Cleaning Action Simulator all four grades of IMSIL imparted a moderate degree of scratching. These materials are potentially useful in the cleaner compositions disclosed in this invention, particularly those IMSIL grades that have an overall particle size distribution substantially below 10 to 15 microns (IMSIL A-15, A-10, A-108).

| | |
|---|---|
| Supplier: | Illinois Minerals Co. |
| Material: | Micronized Amorphous Silica |
| Composition: | Silicon Dioxide (SiO$_2$) |
| Specific Gravity: | 2.65 |

| | IMSIL A-25 | IMSIL A-15 | IMSIL A-10 | IMSIL A-108 |
|---|---|---|---|---|
| Mean Particle Size (Microns) | 4.3 | 2.9 | 2.2 | 1.8 |
| Particle Size Distribution | | | | |
| 40 Micron Diameter, Below | 99.0% | 100.0% | 100.0% | 100.0% |
| 20 Micron Diameter, Below | 96.0% | 100.0% | 100.0% | 100.0% |
| 15 Micron Diameter, Below | 90.0% | 99.0% | 100.0% | 100.0% |
| 10 Micron Diameter, Below | 77.0% | 96.0% | 99.0% | 100.0% |
| 5.0 Micron Diameter, Below | 51.0% | 70.0% | 76.0% | 96.0% |

| ABRASIVE | MANUAL CLEANING ANALYSIS COMMENTS | CLEANING ACTION SIMULATOR ANALYSIS NUMBER OF STROKES | | | |
|---|---|---|---|---|---|
| | | 10 | 25 | 100 | 250 |
| IMSIL A-108 | Polishing Type Action | ++ | ++ | ++ | |
| IMSIL A-10 | Very slight scratching | ++ | ++ | ++ | |
| IMSIL A-15 | Very slight scratching | ++ | ++ | ++ | |

| | | | | |
|---|---|---|---|---|
| IMSIL A-25 | Slight scratching | + | ++ | ++ |

EXAMPLE XIV

This Example illustrates use of a silica as the abrasive component in a contact lens cleaning composition. The cleaner formulation is given in Example X and the testing protocol in Examples XI and XII.

The use of silica with an average particle size of 14 microns and a substantial number of particles above 30 and 40 microns demonstrates the effect of an abrasive outside the scope of this invention. Extremely heavy scratching was inflicted on both contact lenses and buttons cleaned with a composition containing this abrasive.

Supplier: Whittaker, Clark and Daniels, Inc.
Material: 219 Silica
Composition: Silicon Dioxide ($SiO_2$)
Specific Gravity: 2.65

Average Particle Size (Microns)   14
Typical Particle Size Distribution:

| Microns | % Less Than | Microns | % Less Than |
|---|---|---|---|
| 40 | 96 | 5 | 20 |
| 30 | 85 | 2 | 9 |
| 20 | 65 | 1 | 7 |
| 10 | 40 | | |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Silica 219 | Inflicts very heavy scratching on lens | +++ | | | |

EXAMPLE XV

This example illustrates the use of lo micron Talc as the abrasive component in a contact lens cleaning composition. The cleaner formulation is given in Example X and the testing protocol in Examples XI and XII.

Lo micron Talc has a median particles size between 1 and 2 microns and no particles over 15 microns. When evaluated in the cleaner formulation slight scratching of both contact lenses and buttons was noted demonstrating the marginal suitability of this abrasive.

Supplier: Whittaker, Clark and Daniels, Inc.
Material: 2610 Lo Micron Talc
Composition: Silicon Dioxide/Magnesium Oxide ($SiO_2$/MgO)
Specific Gravity: 2.70
Typical Particle Size Distribution

| Microns | % Less Than | Microns | % Less Than |
|---|---|---|---|
| 15 | 100 | 3 | 76 |
| 10 | 98 | 2 | 64 |
| 5 | 90 | 1 | 40 |
| 4 | 84 | 0.5 | 22 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Lo Micron Talc | Very slight scratching | 0 | ++ | | |

EXAMPLE XVI

This example illustrates the use of Vibroxide-M2 as the abrasive component in a contact lens cleaning composition. The cleaner formulation is given in Example X and the testing protocol in Examples XI and XII.

Vibroxide-M2, a zirconium oxide base abrasive, sold by Transelco Division of Ferro Corp. appears to be unsuitable in a contact lens cleaning formulation. This example demonstrates that a particle size range below 10 microns does not necessarily ensure the usefulness of an abrasive in this invention.

Supplier: Ferro Corp. - Transelco Division
Material: Vibroxide - M2
Composition: 56% Zirconium Oxide ($ZrO_2$)

Average Particle Size (Microns)         1.2–1.8
Particle Size Distribution (Microns)    0.5–5

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Vibroxide-M2 | Slight scratching | + | ++ | ++ | |

EXAMPLE XVII

This example illustrates the use of a silica as the abrasive component in a contact lens cleaning composition. The cleaner formulation is given in Example X and the testing protocol in Examples XI and XII.

Illinois Minerals Co. grade 1160 silica contains many particles over 37 microns (400 mesh Tyler screen) and produced moderate scratching in accordance with the testing procedures taught in this disclosure. This material was judged unsuitable for use in a contact lens cleaner formulation.

Supplier: Illinois Minerals Co.
Material: Air Floated Amorphous Silica
Composition: Silicon Dioxide ($SiO_2$)
Specific Gravity: 2.65

| | GRADE 1160 |
|---|---|
| Mean Particle Size (Microns) | 7.0 |
| Particle Size Distribution | |
| 200 Mesh Tyler Screen (Thru) | 99.98% |
| 325 Mesh Tyler Screen (Thru) | 96.98% |
| 400 Mesh Tyler Screen (Thru) | 92.65% |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Grade 1160 | Definite scratching | ++ | ++ | ++ | |

EXAMPLE XVIII

This example illustrates the use of Syloid synthetic silicas in a contact lens cleaning composition. The cleaner formulation is given in Example X and the testing protocol in Examples XI and XII. The Syloid series of silica materials are classified as "hydrogel" type silicas which refers to the method of manufacture. They are unique in that the particles of SYLOID are made up of small, well rounded, clusters and are quite porous. While the base silica itself has a specific gravity of 2.1 the porosity included in a SYLOID particle lowers the density to 1.05 gm/cc or less and in fact, SYLOID grades are differentiated by density.

regular density: 1.05 gm/cc
intermediate density: 0.65 gm/cc
low density: 0.55 gm/cc The results of scratch testing clearly demonstrates the usefulness of SYLOID silicas in a contact lens cleaning formulation.

It is interesting to note the difference between SYLOID 63 and SYLOID 76, both of equal particle size. The higher density SYLOID 63 demonstrates a slight tendency toward scratching contact lenses while the intermediate density SYLOID 76 does not.

Also, because of the unique particle geometry larger size particles (SYLOID 620) can be used successfully in the invention.

| | |
|---|---|
| Supplier: | W. R. Grace Co. - Davison Chemical Division Baltimore, Maryland |
| Material: | Synthetic Silica |
| Composition: | Silicon Dioxide ($SiO_2$) |
| Specific Gravity: | 2.1 |

| Grade | Average Particle Size (Microns) | Silica Particle Density (gms/cc) | Average Pore Diameter (angstroms) |
|---|---|---|---|
| SYLOID 86 | 2 | 0.55 | 200 |
| SYLOID 72 | 4 | 0.65 | 150 |
| SYLOID 74 | 8 | 0.65 | 150 |
| SYLOID 76 | 9 | 0.65 | 150 |
| SYLOID 620 | 20 | 0.65 | 150 |
| SYLOID 63 | 9 | 1.05 | 25 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| SYLOID 86 | No scratching | 0 | 0 | + | |
| SYLOID 72 | No scratching | 0 | 0 | 0 | 0 |
| SYLOID 74 | No scratching | 0 | 0 | + | |
| SYLOID 76 | No scratching | 0 | 0 | 0 | 0 |
| SYLOID 620 | No scratching | 0 | 0 | + | |
| SYLOID 63 | Very slight scratching | ++ | ++ | ++ | |

EXAMPLE XIX

This example illustrates the use of Colloidal Kaolin as the abrasive component in a contact lens cleaning composition. The cleaner formulation is given in Example X and the testing protocol in Examples XI and XII.

Both Kaolin abrasives evaluated had a median particle size of 1 micron but contained a substantial fraction (10%) above 10 microns. However, very little, if any, scratching was noted on contact lenses and buttons cleaned with compositions containing Kaolin as the abrasive component. The results may reflect the relatively low hardness of this mineral and demonstrate the usefulness of Kaolin in the cleaner compositions disclosed in this invention.

| | |
|---|---|
| Supplier: | Whittaker, Clark and Daniels, Inc. |
| Material: | Colloidal Kaolin |
| Composition: | Silicon Dioxide/Aluminum Oxide ($SiO_2/Al_2O_3$) |
| Specific Gravity: | 2.60 |

GRADE: 347 English Colloidal Kaolin USP

| | | | |
|---|---|---|---|
| Median Particle Size (Microns) | 1.0 | | |
| Typical Particle Size Distribution: | | | |
| Microns | % Less Than | Microns | % Less Than |
| 40 | 99 | 2 | 81 |
| 10 | 90 | 1 | 50 |
| 4 | 94 | 0.5 | 25 |
| 3 | 90 | | |

GRADE: 2749 Colloidal Kaolin USP

| | | | |
|---|---|---|---|
| Median Particle Size (Microns) | 1.0 | | |
| Typical Particle Size Distribution: | | | |
| Microns | % Less Than | Microns | % Less Than |
| 10 | 90 | 1 | 50 |
| 4 | 94 | 0.5 | 30 |
| 3 | 90 | | |
| 2 | 80 | | |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Kaolin 347 | No scratching - possible polishing action | + | | | |
| Kaolin 2749 | No scratching | 0 | 0 | 0 | 0 |

EXAMPLE XX

This example illustrates the use of Transelco Alumina as the abrasive component in a contact lens cleaning composition. The cleaner formulation is given in Example X and the testing protocol in Examples XI and XII.

Three grades of alumina, ALOX 721, ALOX PG and MICRONAL 707, supplied by Transelco were judged to be satisfactory as the abrasive component in the contact lens cleaning formulations disclosed in this invention. More specifically, the ALOX 721 would be preferred based on the results obtained in the Cleaning Action Simulator.

| | |
|---|---|
| Supplier: | Ferro Corp. Transelco Division |
| Material: | Alumina Polishing Compounds |
| Composition: | Aluminum Oxide ($Al_2O_3$) |

| | GRADE | | |
|---|---|---|---|
| | ALOX 721 | ALOX PG | MICRONAL 707 |
| Average Particle Size (Microns) | 0.2 | 1.2–1.8 | 2–3 |
| Particle Size Distribution (Microns) | — | 0.6–5 | 0.5–15 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| ALOX 721 | No scratching | 0 | 0 | 0 | |
| ALOX PG | No scratching | 0 | 0 | ++ | |
| MICRONAL 707 | No scratching | 0 | 0 | ++ | |

EXAMPLE XXI

This example illustrates the use of Titanium Dioxide as the abrasive component in a contact lens cleaning composition. The cleaner formulation is given in Example X and the testing protocol in Examples XI and XII.

Both titanium dioxide abrasives cited in this example have narrow particle size distributions with a maximum of 1 micron. Cleaning formulations containing either grade were judged satisfactory on the basis of scratch testing.

| | |
|---|---|
| Supplier: | Whittaker, Clark and Daniels, Inc. |
| Material: | Titanium Dioxide |
| Composition: | Titanium Dioxide (TiO$_2$) |
| Specific Gravity: | 3.90 |

GRADE: 328 Titanium Dioxide

| | |
|---|---|
| Particle Size | |
| Maximum, Microns | 1.0 |
| Average, Microns | 0.3 |
| Dispersible Type | Oil |

GRADE: 3328 Titanium Dioxide

| | |
|---|---|
| Particle Size | |
| Maximum, Microns | 1.0 |
| Average, Microns | 0.3 |
| Dispersible Type | Water |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Titanium Dioxide 328 | No scratching | 0 | + | | |
| Titanium Dioxide 3328 | Very slight scratching | 0 | + | | |

EXAMPLE XXII

This example illustrates the use of Hydrated Alumina as the abrasive component in a contact lens cleaning composition. The cleaner formulation is given in Example X and the testing protocol in Examples XI and XII.

The Hydrated alumina abrasives evaluated ranged in median particle size from about 1 micron to over 45 microns. All three grades proved unsuitable in the cleaner formulation because of moderate scratching of both contact lenses and buttons.

| | |
|---|---|
| Supplier: | Whittaker, Clark and Daniels, Inc. |
| Material: | Hydrated Alumina |
| Composition: | 65% Aluminum Oxide (Al$_2$O$_3$) |
| Specific Gravity: | 2.42 |

GRADE: 604 Hydrated Alumina (Hydral 710)

Typical Particle Size Distribution

| Microns | % less than |
|---|---|
| 2 | 100 |
| 1 | 85 |
| 0.5 | 28 |

GRADE: 614 Hydrated Alumina (C-331)

Median Particle Size (microns): 6.5–9.5

GRADE: 639 Hydrated Alumina (C-31)

Typical Particle Size Distribution

| | |
|---|---|
| Thru 100 mesh, % | 98–99 |
| Thru 200 mesh, % | 90–95 |
| Thru 325 mesh, % | 35–70 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Hyd. Alumina 604 | Definite scratching | ++ | ++ | | |
| Hyd. Alumina 614 | Definite scratching | ++ | ++ | | |
| Hyd. Alumina 639 | Definite scratching | ++ | ++ | | |

EXAMPLE XXIII

This example illustrates the use of Lo Micron Magnesium Silicate as the abrasive component in a contact lens cleaning composition. The cleaner formulation is given in Example X and the testing protocol in Examples XI and XII.

This abrasive has a median particle size between 1 to 2 microns and contains approximately 4%, by weight, of particles above 10 microns. The slight scratching of both contact lenses and buttons demonstrates the marginal suitability of this abrasive in a lens cleaner composition.

| | |
|---|---|
| Supplier: | Whittaker, Clark and Daniels, Inc. |
| Material: | 399 Lo Micron Magnesium Silicate S.F. |
| Composition: | Silicon Dioxide/Magnesium Oxide (SiO$_2$/MgO) |
| Specific Gravity: | 2.70 |

Typical Particle Size Distribution:

| Microns | % Less Than | Microns | % Less Than |
|---|---|---|---|
| 20 | 100 | 4 | 80 |
| 15 | 98 | 2 | 60 |
| 10 | 96 | 1 | 36 |
| 5 | 84 | 0.5 | 16 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Magnesium Silicate | Slight scratching | 0 | 0 | | ++ |

EXAMPLE XXIV

This example illustrates the use of Novacite 1250 as the abrasive component in a contact lens cleaning composition. The cleaner formulation is given in Example X and the testing protocol in Examples XI and XII.

Malvern NOVACITE 1250 is composed of dense, irregularly shaped particles with sharp edges present. The particle size distribution includes approximately 35% of particles over 10 microns. These physical characteristics render this abrasive unsuitable for use in the cleaner composition disclosed in this invention, as evidenced by the scratch testing results.

| | |
|---|---|
| Supplier: | Malvern Minerals Co. |
| Material: | Platey Particulate Silica |
| Composition: | Silicon Dioxide (SiO$_2$) |
| Specific Gravity: | 2.65 |

| | NOVACITE 1250 |
|---|---|
| Average Particle Size (Microns) | 6.5 |

Particle Size Distribution (% finer than sieve opening)

| Micron Diameter | U.S. Sieve Series Number | |
|---|---|---|
| 74 | 200 | 100.00% |
| 53 | 270 | 100.00 |
| 44 | 325 | 99.99 |
| 37 | 400 | 99.92 |
| 30 | 475 | 99.10 |
| 20 | 625 | 92.00 |
| 15 | 950 | 86.30 |

-continued

| | | |
|---|---|---|
| 10 | 1250 | 65.40 |
| 5 | 2500 | 19.84 |
| 3 | 4500 | 11.64 |
| 1 | 12500 | 3.45 |

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| Novacite 1250 | Definite scratching | ++ | ++ | ++ | |

EXAMPLE XXV

This example illustrates the use of Meller Alumina as the abrasive component in a contact lens cleaning composition. The cleaner formulation is given in Example X and the testing protocol in Examples XI and XII.

Of the four particle size grades of Alumina supplied by Meller Co., three were judged unsatisfactory as the abrasive component in the cleaner composition. The lowest particle size average, Meller 0.3 alumina, proved marginal in performance.

| | |
|---|---|
| Supplier: | Adolf Meller Co. |
| Material: | Alumina Polishing Powder |
| Composition: | Aluminum Oxide (Al$_2$O$_3$) |
| Specific Gravity: | 3.98 |

GRADES
By Average Particle Size 0.3 Micron
1.0 Micron
3.0 Micron
8.0 Micron

| | MANUAL CLEANING ANALYSIS | CLEANING ACTION SIMULATOR ANALYSIS NUMBER OF STROKES | | | |
|---|---|---|---|---|---|
| Abrasive | Comments | 10 | 25 | 100 | 250 |
| MELLER 0.3 | Slight scratching | 0 | 0 | ++ | |
| MELLER 1.0 | Slight scratching | + | ++ | ++ | |
| MELLER 3.0 | Definite scratching | ++ | ++ | ++ | |
| MELLER 8.0 | Definite scratching | ++ | ++ | ++ | |

While specific Examples of this invention have been shown and described, many variations are possible. When the cleaning solutions of this invention are used only as cleaners, the surface active agents preferably comprise from 0.1 to 30% by weight of the material, the abrasive particles from 0.1 to 5% by weight and the suspending vehicle from 99.8 to 65.0% by weight, with a suspending agent based on 100 parts of the above being from 5 to 25 parts when inorganic salts are used and from 1 to 10 parts when polymers are used. The same suspending agents are used when the cleaning solution is used to act as a cleaner/polish but here the surfactant amount may range from 0.1 to 30% by weight and the abrasive amount is raised to from 5 to 25% by weight while the water or other suspending vehicle is used to bring the material to 100%. When a paste or gel, rather than a free flowing liquid is desired, the formulation can carry from 15 to 40% by weight of the surface active agent, from 5 to 50% by weight of an abrasive and the balance water or other solvent which is water soluble. Of course, one or more surface active agents, abrasives, or solvents can be used in a single composition if desired.

The particle sizes of the abrasives can vary greatly and depend on the type of abrasive used. Although many factors, such as particle shape and density, influence the useful particle size range of the abrasive in this invention an inverse correlation with hardness can be demonstrated. As the hardness of the particle material increases, the average particle size necessary to avoid scratching contact lenses decreases. The following Table illustrates this correlation:

| Material | Mohs Hardness* | Effective Average Particle Size (Microns) | Upper Particle Size Limit (Microns) |
|---|---|---|---|
| Alumina | 9 | 0.01–0.5 | <<10 |
| Zirconia | 7–8 | 0.05–1.0 | <10 |
| Silica | 6–7 | 1–5 | 10–15 |
| Kaolinite | 2–3 | 1–10 | 20–30 |
| Talc | 1 | 1–10 | 20–30 |
| Syloid | 6–7 | 1–20 | 20–30 |

*scale from 1 (Talc) to 10 (Diamond)

In the actual practice of this invention the particle size distribution of the abrasive component may be altered by screening, ball milling or filtration to remove or reduce the size of the larger particles present. In this manner, the particle size distribution can be tailored to the proper median particle size with no particles large enough to produce scratching of hard contact lenses. Generally, particle sizes standardly used for lens polishing in the ophthalmic industry can be used.

In general, the abrasives useful in this invention have an average particle size below 10 microns with few particles above 20 microns. The SYLOID series (or equivalent synthetic silicas such as SILCRON, a synthetic silica sold by Pittsburg Plate Glass of Pittsburgh, Pa.) is a notable exception where average particle sizes of up to 20 microns can be used successfully in the cleaner compositions disclosed in this invention. Such synthetic silicas have a well-rounded shape and are light, spongy particles with high surface area. The synthetic silicas are referred to as silica gels and are often made by reaction between sodium silicate and a mineral acid.

While specific Examples of the invention have been shown and described, many variations are possible. When the cleaning solutions of this invention are used only as cleaners, the surface active agents preferably comprise from 0.1 to 30% by weight of the material, the abrasive particles from 0.1 to 5% by weight and the carrier vehicle such as water from 99.8 to 69.9% by weight with a suspending agent based on 100 parts of the above being from 5 to 25 parts when inorganic salts are used and from 1 to 10 parts when polymers are used. The same suspending agents are used when the cleaning solution is used to act as a cleaner-polisher but here the surfactant amount may range from 0.1 to 30% by weight and the abrasive amount is raised to from 5 to 25% by weight while the water or other suspending vehicle is used to bring the material to 100%. When a paste rather than a free flowing liquid is desired, the formulation can carry from 15 to 40% by weight of the surface active agent, from 20 to 50% by weight of an abrasive and the balance water or other solvent which is water soluble. Of course, one or more surface active agents, abrasives or solvents can be used in a single composition if desired.

The particle sizes of the abrasives can vary greatly but they are preferably that standardly used for lens polishing in the ophthalmic industry. Particle sizes of silica for example, when an average of 9 microns and a range of from 1 to 20 microns with an upper limit of 30 microns in the form of Syloid 63, a trademarked product of Division Chemcal, W. R. Grace, Co. of Baltimore, Md., can be used. Other size ranges are possible.

In all cases, the surface active agent in the form of a detergent or surfactant acts along with the abrasive to combine the best qualities of both which can result in synergistic action to clean contact lenses in accordance with the method of this invention.

While surface active agents have been specifically noted in this application, other surface active agents can be used. Such agents associate in water to form a colloidal particle known as a micelle. The structure is such that the hydrophobic hydrocarbon chains are inside, remote from the solvent and the polar head groups are on the surface of the particle. The presence of micelles in an aqueous solution endows it with minute regions which are predominantly hydrophobic in nature. This allows for high solubility in water and good wetting of the materials.

What is claimed is:

1. A method of cleaning an ophthalmic hard contact lens, said method comprising,
    applying an aqueous cleaning solution containing a silica gel abrasive having an average particle size of no more than 20 microns of a particle size sufficient for use in lens polishing, a suspending agent and a surface active agent in an amount of from about 0.1 to about 30% by weight to a surface of said lens and abrading said surface to remove unwanted surface deposits if present without changing the power of said contact lens said abrasive being present in an amount of from about 0.1% by weight to under 10% by weight,
    said suspending agent being selected from the class consisting of inorganic salts and hydrophilic polymers.

2. A method of cleaning an ophthalmic hard contact lens, said method comprising,
    applying an aqueous cleaning solution containing a silica gel abrasive having an average particle size of no more than 10 microns of a particle size sufficient for use in lens polishing present in an amount of from 0.1% by weight to a value below that which would cause damaging scratching or changing of the power of the lens,
    a surface active agent in an amount of from 0.1 to 30% by weight and a separate suspending agent to a surface of a lens and abrading said surface to remove unwanted surface deposits if present without changing the power of the lens or adversely affecting or scratching said lens,
    said suspending agent being selected from the class consisting of inorganic salts and hydrophilic polymers.

3. A method in accordance with claim 2 wherein said abrasive is present in an amount of from 0.1 to 5% by weight.

* * * * *